United States Patent
Bianchini et al.

(10) Patent No.: US 10,542,085 B2
(45) Date of Patent: Jan. 21, 2020

(54) HARVESTING SPARE STORAGE IN A DATA CENTER

(71) Applicant: Microsoft Technology Licensing, LLC, Redmond, WA (US)

(72) Inventors: Ricardo Bianchini, Bellevue, WA (US); Inigo Goiri Presa, Bellevue, WA (US); Marcus Felipe Fontoura, Clyde Hill, WA (US); Georgios Prekas, Lausanne (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 407 days.

(21) Appl. No.: 15/189,970

(22) Filed: Jun. 22, 2016

(65) Prior Publication Data

US 2017/0374144 A1    Dec. 28, 2017

(51) Int. Cl.
   G06F 15/173    (2006.01)
   H04L 29/08     (2006.01)

(52) U.S. Cl.
   CPC ................. H04L 67/1095 (2013.01)

(58) Field of Classification Search
   USPC ........................................ 709/224
   See application file for complete search history.

(56) References Cited

U.S. PATENT DOCUMENTS

| | | | |
|---|---|---|---|
| 7,774,457 B1 | 8/2010 | Talwar et al. | |
| 8,156,502 B1 | 4/2012 | Blanding | |
| 8,555,287 B2 | 10/2013 | Ding et al. | |
| 9,015,324 B2 | 4/2015 | Jackson | |
| 9,794,331 B1* | 10/2017 | Frasca | H04L 67/1008 |
| 2007/0180453 A1 | 8/2007 | Burr et al. | |
| 2007/0260732 A1* | 11/2007 | Koretz | H04L 67/1095 709/226 |
| 2009/0037926 A1 | 2/2009 | Dinda et al. | |
| 2013/0054808 A1* | 2/2013 | Hildebrand | G06F 9/505 709/226 |
| 2013/0185729 A1 | 7/2013 | Vasic et al. | |
| 2014/0089477 A1* | 3/2014 | Zhou | H04L 43/0817 709/222 |

(Continued)

OTHER PUBLICATIONS

Gandhi, Anshul, "Dynamic Server Provisioning for Data Center Power Management," In Thesis of Carnegie Mellon University CMU-CS-13-110, Jun. 2013, 196 pages.

(Continued)

Primary Examiner — Hee Soo Kim
(74) Attorney, Agent, or Firm — Shook, Hardy & Bacon LLP

(57) ABSTRACT

A method and system for selecting servers for storage of replicas of a block of data is provided. The system selects a first server for storage of the data. The first server has a first processor utilization classification and a first reimaging rate classification. The system then selects a second server for storage of the data. The second server has a second processor utilization classification and a second reimaging rate classification. The system selects the second server so that the second processor utilization classification is different from the first processor utilization classification and the second reimaging rate classification is different from the first reimaging rate classification.

20 Claims, 12 Drawing Sheets

(56) References Cited

U.S. PATENT DOCUMENTS

2014/0373010 A1    12/2014   Falco et al.

OTHER PUBLICATIONS

Clay et al., "Augmenting MapReduce with Active Volunteer Resources," In Proceedings of 23rd ACM Symposium on Operating Systems Principles, Oct. 23, 2011, pp. 1-2.

Clay et al., "Accelerating Batch Analytics with Residual Resources from Interactive Clouds," In Proceedings of IEEE 21st International Symposium on Modeling, Analysis & Simulation of Computer and Telecommunication Systems, Aug. 14, 2013, pp. 414-423.

Sharma et al., "HybridMR: A Hierarchical MapReduce Scheduler for Hybrid Data Centers," In Proceedings of IEEE 33rd International Conference on Distributed Computing Systems, Jul. 8, 2013, pp. 102-111.

Carrera et al., "Enabling resource sharing between transactional and batch workloads using dynamic application placement," In Proceedings of 9th ACM/IFIP/USENIX International Conference on Middleware, Dec. 1, 2008, pp. 203-222.

Ahmad et al., "Tarazu: Optimizing MapReduce on Heterogeneous Clusters," In Proceedings of the seventeenth international conference on Architectural Support for Programming Languages and Operating Systems, Mar. 3, 2012, pp. 61-74.

Barroso et al., "The Datacenter as a Computer: An Introduction to the Design of Warehouse-Scale Machines," In Publication of Morgan and Claypool, Jul. 2013, 156 pages.

Carvalho et al., "Long-Term SLOs for Reclaimed Cloud Computing Resources," In Proceedings of ACM Symposium on Cloud Computing, Nov. 3, 2014, 13 pages.

Curino et al., "Reservation-Based Scheduling: If You're Late Don't Blame Us!", In Proceedings of the ACM Symposium on Cloud Computing, Nov. 3, 2014, 14 pages.

Delimitro et al., "Paragon: QoS-aware Scheduling for Heterogeneous Datacenters," In Proceedings of the eighteenth international conference on Architectural support for programming languages and operating systems, Mar. 16, 2013, pp. 1-12.

Delimitrou et al., "Quasar: Resource efficient and QoS-aware Cluster Management," In Proceedings of the 19th international conference on Architectural support for programming languages and operating systems, Mar. 1, 2014, 17 pages.

Goder et al., "Bistro: Scheduling Data-Parallel Jobs against Live Production Systems," In Proceedings of the USENIX Annual Technical Conference, Jul. 8, 2015, pp. 459-471.

Goiri et al., "ApproxHadoop: Bringing Approximations to MapReduce Frameworks," In Proceedings of the Twentieth International Conference on Architectural Support for Programming Languages and Operating Systems, Mar. 14, 2015, 15 pages.

Goiri et al., "GreenHadoop: Leveraging Green Energy in Data-Processing Frameworks," In Proceedings of the 7th ACM European conference on Computer systems, Apr. 10, 2012, 14 pages.

Grandl et al., "Multi-Resource Packing for Cluster Schedulers," In Proceedings of the ACM conference on SIGCOMM, Aug. 17, 2014, 13 pages.

Hunt et al., "ZooKeeper: Wait-Free Coordination for Internet-Scale Systems," In Proceedings of the USENIX Annual Technical Conference, Jun. 23, 2010, pp. 1-14.

Isard, Michael, "Autopilot: Automatic Data Center Management," In Proceedings of ACM SIGOPS Operating Systems Review—Systems work at Microsoft Research, vol. 41, Issue 2, Apr. 2007, 8 pages.

Karanasos et al., "Mercury: Hybrid Centralized and Distributed Scheduling in Large Shared Clusters," In Proceedings of the USENIX Annual Technical Conference, Jul. 8, 2015, pp. 485-497.

Kasture et al., "Ubik: Efficient Cache Sharing with Strict QoS for Latency-critical Workloads," In Proceedings of the 19th international conference on Architectural support for programming languages and operating systems, Mar. 1, 2014, pp. 729-742.

Laurenzano et al., "Protean Code: Achieving Near-Free Online Code Transformations for Warehouse Scale Computers," In Proceedings of the 47th Annual IEEE/ACM International Symposium on Microarchitecture, Dec. 13, 2014, pp. 558-570.

Leverich et al., "Reconciling high server utilization and sub-millisecond quality-of-service," In Proceedings of the Ninth European Conference on Computer Systems, Apr. 13, 2014, 14 pages.

Lo et al., "Heracles: Improving Resource Efficiency at Scale," In Proceedings of the 42nd Annual International Symposium on Computer Architecture, Jun. 13, 2015, pp. 450-462.

Mars et al., "Bubble-Up: Increasing Utilization in Modern Warehouse Scale Computers via Sensible Co-locations," In Proceedings of 44th Annual IEEE/ACM International Symposium on Microarchitecture, Dec. 3, 2011, 12 pages.

Sahah et al., "Apache Tez: A Unifying Framework for Modeling and Building Data Processing Applications," In Proceedings of ACM SIGMOD International Conference on Management of Data, May 31, 2015, pp. 1357-1369.

Tang et al., "Compiling for Niceness: Mitigating Contention for QoS in Warehouse Scale Computers," In Proceedings of Tenth International Symposium on Code Generation and Optimization, Apr. 31, 2012, pp. 1-12.

Tang et al., "ReQoS: Reactive Static/Dynamic Compilation for QoS in Warehouse Scale Computers," In Proceedings of Eighteenth International Conference on Architectural Support for Programming Languages and Operating Systems, Mar. 16, 2013, pp. 89-100.

Thusoo et al., "Hive—A Warehousing Solution Over a Map-Reduce Framework," In Proceedings of VLDB Endowment, vol. 2, Issue 2, Aug. 24, 2009, pp. 1626-1629.

"Active TPC Benchmarks," Retrieved on: Apr. 15, 2016 Available at: http://www.tpc.org/information/benchmarks.asp.

Vavilapalli et al., "Apache Hadoop YARN: Yet Another Resource Negotiator," In Proceedings of 4th Annual Symposium on Cloud Computing, Oct. 1, 2013, 16 pages.

Verma et al., "Large-scale cluster management at Google with Borg," In Proceedings of Tenth European Conference on Computer Systems, Apr. 21, 2015, 18 pages.

Yang et al., "Bubbleflux: Precise Online QoS Management for Increased Utilization in Warehouse Scale Computers," In Proceedings of 40th Annual International Symposium on Computer Architecture, Jun. 23, 2013, pp. 607-618.

Zaharia et al., "Delay Scheduling: A Simple Technique for Achieving Locality and Fairness in Cluster Scheduling," In Proceedings of 5th European conference on Computer systems, Apr. 13, 2013, pp. 265-278.

Zhang et al., "CPI2: CPU Performance Isolation for Shared Compute Clusters," In Proceedings of 8th ACM European Conference on Computer Systems, Apr. 15, 2013, pp. 379-391.

Zhang et al., "SMiTe: Precise QoS Prediction on Real-System SMT Processors to Improve Utilization in Warehouse Scale Computers," In Proceedings of 47th Annual IEEE/ACM International Symposium on Microarchitecture, Dec. 13, 2014, pp. 406-418.

McCandless et al., "Lucene in Action, Second Edition: Covers Apache Lucene 3.0", In Publication of Manning Publications, Jul. 28, 2010, 528 pages.

\* cited by examiner

HARVESTING SPARE STORAGE IN A DATA CENTER

BACKGROUND

An organization (e.g., large company) may have a data center with hundreds or thousands of servers to run its application programs. These applications may include web servers, web searching, web crawling, social networking, customer relationship management ("CRM"), enterprise resource planning ("ERP"), accounting, human resource management, and so on.

A data center typically has a management and deployment ("M&D") system that controls the overall allocation of computing resources (e.g., servers and disk space) in the data center. To help with the management, an M&D system may logically organize the servers of the data center into groups of servers that are logically related in some way. Each logical grouping of servers may be referred to as an environment. Each server in an environment may be assigned a specific functionality, referred to as a machine function. For example, a web search service may need multiple environments that each support a sub-service such as searching or crawling. Each environment may have multiple servers that each support a single machine function needed to support the sub-service of the environment. For example, an environment that supports searching may have some servers with machine functions that support retrieving results and others that support ranking results. The combination of an environment and machine function is referred to as a primary tenant.

To ensure that each primary tenant has sufficient computing resources, an organization may allocate more than enough servers to meet the anticipated peak demand. As a result, the central processing unit ("CPU") and the disk space utilizations of the servers may be relatively low. Attempts have been made to allow other applications to run on these servers, referred to as co-location of applications, so that the computing resources do not go wasted. These co-located applications, which are typically batch jobs, are referred to as secondary tenants. They are secondary tenants in the sense that the primary tenant is given a higher priority so that its processing can be performed in a timely manner. For example, an organization may have data analytics applications that run as secondary tenants. Each primary tenant executing at a server may use the local file system of that server, and the secondary tenants may use a distributed file system. The use of a local file system by the primary tenants helps improve performance of the primary tenants as their data is stored locally. The use of a distributed file system by the secondary tenants helps ensure that their data will be accessible even if a secondary tenant is moved to a different server.

In addition to an M&D system, a data center may provide a distributed file system that further supports security of the data and also supports replication of data to help ensure the reliability of the data. One such file system is the Hadoop Distributed File System ("HDFS"), which supports storing data on a local storage device (e.g., disk) of each server. The HDFS includes a global Name Node ("NN") running on a dedicated server and a Data Node ("DN") running on each server. The NN manages the file system namespace, selects to which DNs each block of a file is to be stored, and maintains a mapping of blocks to DNs. The HDFS replicates each block (e.g., 256 MB) three times by default. It tries to place a first replica on the server that created the block, a second replica in another server in the rack that contains the server that created the block, and a third replica in a server of a different rack. To store a block, a client sends a request to the NN, the NN returns a list of servers to which replicas of the block are to be stored, and the client requests the DN of each server in the list to store a replica. To access a block, a client sends a request to the NN, the NN returns a list of the servers that store replicas of the block, and the client requests the DN of the servers in the list to provide access to the replica that it stores until access is successfully provided. Each DN manages the blocks on its local storage according to the NN's commands and accesses the blocks on behalf of clients. The HDFS recreates lost replicas while trying to avoid overloading the data center. A replica may be lost for various reasons, such as a failure at a server that stores a replica or the reimaging of a disk that stores a replica. A disk can be reimaged for a variety of reasons. For example, a disk may be reimaged when an environment is to be redeployed or restarted from scratch, when the M&D system conducts resiliency testing, and when a disk has undergone maintenance.

To help ensure a robust computing environment, an M&D system may collect various types of performance statistics on a per-server basis. For example, an M&D system may collect average CPU utilization information for each server on a periodic basis (e.g., every two minutes). As another example, an M&D system may track each reimaging of a disk on a per-server basis.

SUMMARY

A method and system for selecting servers for storage of replicas of a block of data is provided. In some embodiments, the system selects a first server for storage of the data. The first server has a first processor utilization classification (e.g., based on its historical peak CPU utilization) and a first reimaging rate classification (e.g., based on how often its storage has historically been reimaged). The system then selects a second server for storage of the data. The second server has a second processor utilization classification and a second reimaging rate classification. The system selects the second server so that the second processor utilization classification is different from the first processor utilization classification and the second reimaging rate classification is different from the first reimaging rate classification.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
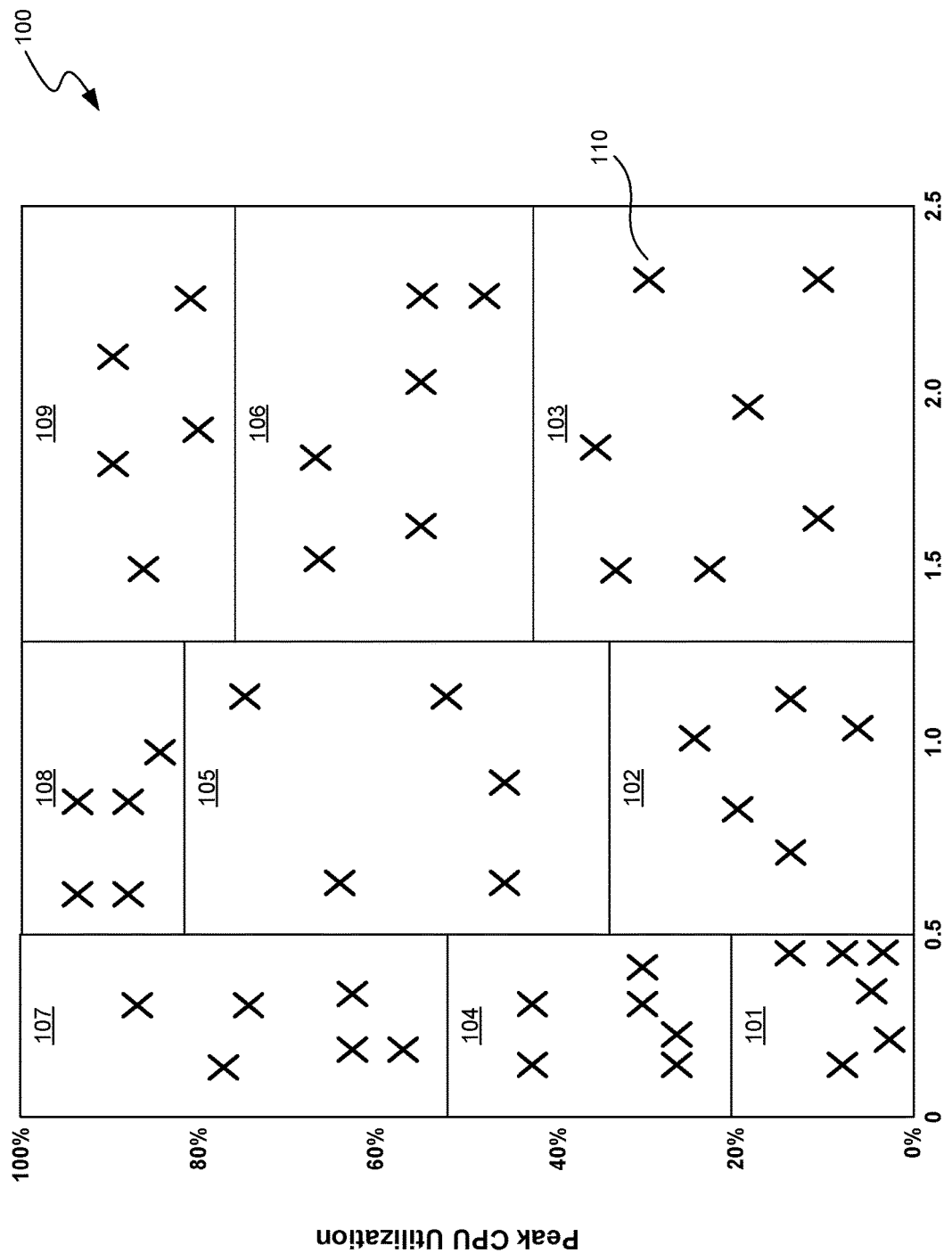
FIG. 1 illustrates the classes of servers or primary tenants in some embodiments.

A method and system for selecting servers for storage of replicas of blocks of data is provided. In some embodiments, a spare storage harvesting ("SSH") system seeks to meet the goals of (1) not using more storage of a server than is allowed by the primary tenant, (2) not interfering with computing resources needed by the primary tenant (e.g., CPU needs) of a server, and/or (3) placing replicas in an attempt to optimize both the durability and the availability of the block. "Durability" refers to the likelihood that not all the replicas of a block will be lost, for example, because of reimaging. "Availability" refers to the likelihood that at least one replica of a block is stored at a server that has sufficient available computing resources to handle a request to access the block without interfering with the primary tenant. The SSH system seeks to meet the first goal by allowing each primary tenant to register with the SSH system the amount of storage that it has available for storing replicas. The SSH system seeks to meet the second goal by allowing each server to refuse to store a replica or refuse access to a replica that it stores when such storing or accessing might result in the server not having enough computing resources to meet the needs of its primary tenant. The SSH system attempts to meet the third goal by selecting servers for storage of replicas based on the processor utilization and the reimaging rates of the servers so that the replicas of the same block are stored at servers with different processor utilizations and reimaging rates. Because the replicas of the same block are stored at servers with a variety of processor utilizations and reimaging rates, all the replicas of the same block are prevented, for example, from being stored on servers with high processor utilization and high reimaging rates, which would mean the replicas would have low durability and availability. This also prevents all the replicas of the same block from being stored on servers with low processor utilization and low reimaging rates, which would mean the replicas would have high durability and availability. However, it would also mean that all such servers might fill up quickly, which might result in replicas of the same block being subsequently stored on servers with high processor utilization and reimaging rates, leading to replicas with low durability and availability. Thus, the SSH system seeks to store the replicas for each block of data across a range of processor utilizations and reimaging rates.

Although the SSH system is described primarily in the context of using both processor utilization and reimaging rate when deciding where to store replicas of a block, other resource utilization measurements and/or lost replica measurements can be used. The resource utilization measurements for a server indicate whether that server has sufficient available computing resources to handle a request to access a replica of a block stored at that server. The resource utilization measurements may include peak CPU utilization, network utilization, disk bandwidth utilization, memory utilization, and so on. The lost replica measurements for a server indicate the likelihood that a replica of a block stored at that server will be lost. The lost replica measurements may include reimaging rates, disk failure rates, and so on. The SSH system may select servers for storage of a replica of a block based solely on a resource utilization measurement or solely on a lost replica measurement. For example, if a data center has a low reimaging rate, then the SSH might use only peak CPU utilization. In contrast, if a data center has a high reimaging and a very low peak CPU utilization, the SSH system might use only the reimaging rate. The resource utilization measurements and the lost replica measurements are referred to collectively as "replica accessibility measurements" as they are measures of whether a replica of a block will be accessible when needed.

The SSH system may use a processor utilization that is a peak CPU utilization for each server that is identified from the CPU utilization data collected by an M&D system. The CPU utilization may be expressed as a percentage. The SSH system may calculate the reimaging ("REI") rate for each server from the reimaging data that is collected by an M&D system. The REI rate may be expressed as the average number of reimages per month. The SSH system assigns a CPU utilization classification and an REI rate classification to each server based on its CPU utilization and REI rate. (The CPU utilization classification is an example of a resource utilization classification, and the REI rate classification is an example of a lost replica classification. Resource utilization classifications and lost replica classifications are collectively referred to as "replica accessibility classifications.") The servers with the same CPU utilization and REI rate are considered to be in the same class or cluster of servers. If the CPU utilization classifications and the REI rate classifications are low, medium, and high, then there will be nine classes or clusters of servers.

In some embodiments, to select the servers for storing the replicas of a block, the SSH system selects a first server irrespective of its classifications. For example, the SSH system may select the server that requests the block to be stored as the first server without regard to its CPU utilization classification or its REI rate classification. The SSH system then selects a second server that has both a CPU utilization classification and an REI rate classification that is different from that of the first server. For example, if the first server has a CPU utilization of medium and an REI rate of high, then the second server can have a CPU utilization of low or high and an REI rate of low or medium. If there are nine classes as discussed above, then the five classes that have a CPU utilization of medium or an REI rate of high are effectively excluded or designated as taken when selecting the second server. Thus, the SSH system selects the second server from one of the remaining four classes that are not excluded. The SSH system may randomly select a server from one of those four classes as the second server.

If there are to be at least three replicas of the block, the SSH system selects a third server that has both a CPU utilization classification and an REI rate classification that is different from that of the first server and the second server. For example, if the second server has a CPU utilization of low and an REI rate of medium, then the third server can only have a CPU utilization of high and an REI rate of low. Of the four classes from which the second server was selected, the three classes with a CPU utilization of low or an REI rate of medium are effectively excluded in addition to the already excluded classes when selecting the third server. Thus, the SSH system selects, possibly randomly, the third server from the one remaining class. If there are to be more than three replicas, the SSH system may repeat the process as discussed above for selecting, possibly randomly, a fourth server but starting again with all nine classes included, then excluding five of the classes based on the classifications of the fourth server, selecting a fifth server, possibly randomly, from the four remaining classes, and so on.

In some embodiments, the SSH system may classify primary tenants, rather than classifying individual servers. In such an embodiment, the SSH system may assign one or more replica accessibility measurements to each primary tenant that may be based on, for example, an average of the resource utilization measurements and an average of the lost replica measurements of the servers hosting that primary tenant. The SSH system then generates classes or clusters of primary tenants that have similar replica accessibility measurements. To select the servers for storing the replicas of a block, the SSH system selects a first primary tenant (e.g., the primary tenant of the server that is requesting to store the block) in a first class. The SSH system then selects a first server that hosts the primary tenant (e.g., the server that is requesting to store the block). The SSH system then selects a second primary tenant that is in a second class that is different from the first class. The SSH system then selects a second server, possibly randomly, that hosts the second primary tenant. The SSH system continues the process of selecting primary tenants from different classes until enough servers are selected to store each replica of a block. If the classes are based on multiple replica accessibility measurements (e.g., both peak CPU utilization and REI rate), then the SSH system selects primary tenants from classes that have no replica accessibility measurements that are similar to that of a previously selected primary tenant. If there is no such class and not enough servers have been selected, the SSH system may repeat the process as if no classes were previously selected.

FIG. 1 illustrates the classes of servers or primary tenants in some embodiments. The graph 100 maps servers to their CPU utilizations and REI rates. The graph has an x-axis that represents the REI rate, which ranges from 0 to 2.5 reimages per month, and a y-axis that represents the CPU utilization, which ranges from 0 to 100%. Each "X" represents the CPU utilization and REI rate of a server. For example, "X" 110 represents a server with an REI rate of about 2.3 and a CPU utilization of about 30%. The servers are grouped into classes 101-109. For example, class 101 includes servers with an REI rate from 0.0 to 0.5 and a CPU utilization from 0% to 20%, and class 105 includes servers with an REI rate from 0.5 to 1.3 and a CPU utilization from 30% to 80%. The SSH system could use classes that span equal ranges of CPU utilizations and REI rates. For example, the REI rate classifications could be for ranges 0.0 to 0.8, 0.8 to 1.6, and 1.6 to 2.5, and the CPU utilization classifications could be for ranges 0% to 33%, 33% to 66%, and 66% to 100%. The graph may alternatively map primary tenants, rather than individual servers, to their CPU utilizations and REI rates. In the following, the SSH system is described based on assigning servers to classes. However, the SSH may assign primary tenants to classes and select servers for storage of replicas of a block by selecting a class, selecting a primary tenant with the selected class, and selecting a server of the selected primary tenant.

In some embodiments, the SSH system selects classes so that the total available storage of the servers in each class is approximately equal. Each primary tenant of a server may notify the SSH system (e.g., via an M&D system) of the storage that it has available for use in storing replicas. The SSH system may calculate the total available storage and assign servers to classes so that each class has approximately the same amount of available storage. To assign servers to classes, the SSH system may sort the servers based on their REI rates from low to high. The SSH system then selects the servers in order, assigning them an REI rate classification of low until the total available storage for the servers with that classification reaches ⅓ of the total available storage. The SSH system then continues selecting servers in order, assigning them an REI rate classification of medium until the total available storage for the servers with that classification reaches ⅓ of the total available storage. The SSH system then assigns all the remaining servers an REI classification of high. All the servers with same REI rate classification may be considered a super class or super cluster that is further divided into the classes or clusters based on their CPU utilizations. Alternatively, the SSH system may generate the super classes based on CPU utilizations and then the classes based on REI rates. The SSH system then sorts the servers with an REI classification of low based on their CPU utilizations from low to high. The SSH system then selects the servers in order, assigning them a CPU utilization classification of low until the total available storage for those servers with that classification reaches ⅑ of the total available storage. The SSH system repeats this process for the CPU utilizations of medium and high for servers with an REI rate classification of low. The SSH system then performs similar processing for servers with REI rate classifications of medium and high. As a result, the servers in each of the nine classes will represent approximately ⅑ of the total available storage of the data center. Although the SSH system is illustrated using three CPU utilization classifications and three REI rate classifications for a total of nine classes, the SSH system may use any number of classifications, such as four CPU utilization classifications and five REI rate classifications for a total of 20 classes.

In some embodiments, the SSH system may select servers for storing replicas of a block so that the replicas are stored in servers of different logical groupings of servers wherein servers are clustered into groupings based on similarity in resource utilization measurements and/or lost replica measurements. As discussed above, an M&D system may logically group servers based on their primary tenant. For example, all the servers with a primary tenant with the same environment may represent one logical grouping, or all the servers with the same primary tenant (i.e., same environment and same machine function) may represent one logical grouping. Alternatively, servers may be logically grouped based on customer, customer attribute, and so on. The arrangement of servers into racks and rack sets or otherwise based on their physical locations in a data center is considered to be a physical grouping of servers and is not considered to be a logical grouping of servers. To select servers for storing replicas of a block, the SSH system selects a first server for storing a first replica, which may be the server that requests to store the block. The server then selects, possibly randomly, a second server to store the second replica such that the second server is selected from a logical grouping that is different from the logical grouping of the first server. The SSH system may then repeat this process to select servers to store additional replicas from other logical groupings. In this way, the SSH system stores replicas on servers of different logical groupings to help ensure that the selected servers will have different CPU utilization and REI rates because servers in the same logical grouping may have similar CPU utilizations and REI rates. In some embodiments, the SSH system may use CPU utilization classifications and REI rate classifications along with the logical grouping when selecting servers. For example, the SSH system may select servers based on CPU utilization classifications and REI rate classifications as discussed above, but further ensure that the selected servers for storing replicas of a block are selected from different logical groupings. So, for example, the second server may be randomly selected from one of the four remaining classes so long as the server is not in the same logical grouping as the first server.

Figure 2:
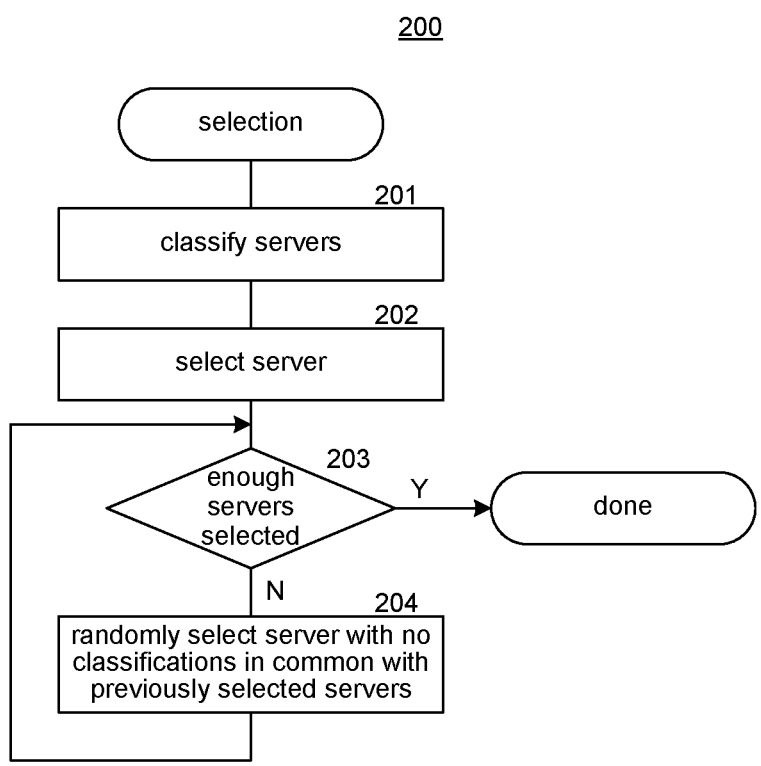
FIG. 2 is a high-level flow diagram illustrating the selecting of servers for storage of replicas of a block in some embodiments.

FIG. 2 is a high-level flow diagram illustrating the selecting of servers for storage of replicas of a block in some embodiments. A selection component 200 selects servers to distribute the storage of the replicas of a block across servers with different CPU utilizations and REI rates. In block 201, the component classifies the servers based on their CPU utilization and REI rates. In block 202, the component selects a server for storing a first replica of the block. For example, the component may select the server that created the block. In decision block 203, if enough servers have already been selected to store the required number of replicas, the component completes, else the component continues at block 204. In block 204, the component randomly selects a server with no classifications in common with previously selected servers. The component then loops to block 203 to determine whether enough servers have already been selected.

Figure 3:
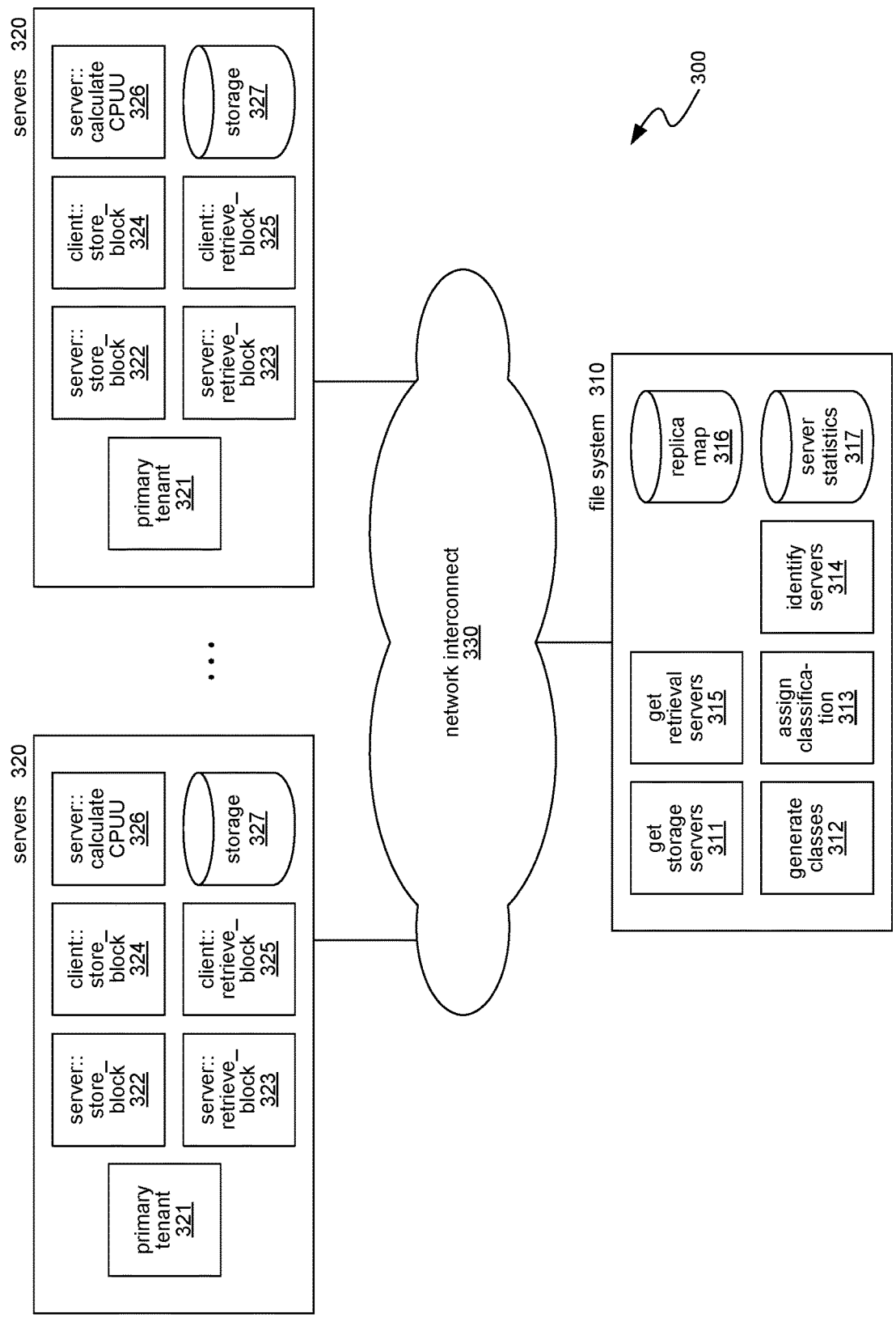
FIG. 3 is a block diagram illustrating a data center using an SSH system in some embodiments.

FIG. 3 is a block diagram illustrating a data center using an SSH system in some embodiments. A data center 300 includes a file system 310, and servers 320, which are connected via a network interconnect 330. The SSH system, which may be implemented in part of an NN of HDFS, may include a get storage servers component 311, a generate classes component 312, an assign classification component 313, an identify servers component 314, a get retrieval servers component 315, a replica map store 316, and a server statistics store 317. The get storage servers component identifies servers to which replicas of a block are to be stored. The generate classes component generates classes of servers. The generate classes component invokes the assign classification component to assign a classification to each server. The identify servers component is invoked by the get storage servers component to identify the servers based on the generated classes. The get storage servers component stores into the replica map store the mapping of each block (e.g., block identifier) to the servers to which the replicas of the block are stored. The get retrieval servers component retrieves the mapping of a block to its servers from the replica map store. The server statistics store stores the statistics used by the SSH system such as CPU utilization and REI rates as collected by an M&D system. Each server includes a primary tenant 321, a server::store_block component 322, a server::retrieve_block component 323, a client::store_block component 324, a client::retrieve_block component 325, a server::calculate_CPU_utilization component 326, and a storage 327. (The term "client" refers to a server that is requesting a service of another server.) The server::store_block component and the server::retrieve_block component may be part of a DN that stores a replica of a block and retrieves a replica of a block when requested. The client::store_block component and the client::retrieve_block component are invoked by the primary tenant to store a block and retrieve a block. The server::calculate_CPU_utilization component is invoked to calculate the CPU utilization of the server and send notifications to the SSH system (e.g., via the M&D system). The storage represents the storage of the server that includes the storage used by the primary tenant and storage available for storing replicas.

The computing systems on which the SSH system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have data recorded on them or may be encoded with computer-executable instructions or logic that implements the SSH system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting deployment data using the keys.

The SSH system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the SSH system may be implemented in hardware using, for example, an application-specific integrated circuit (ASIC).

Figure 4:
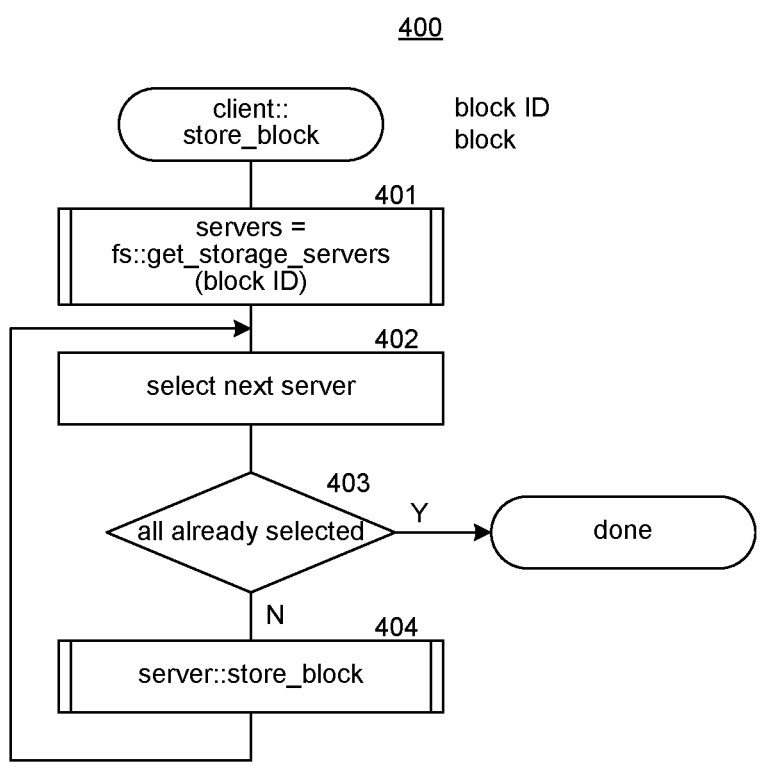
FIG. 4 is a flow diagram that illustrates processing of a client::store_block component of the SSH system in some embodiments.

FIG. 4 is a flow diagram that illustrates processing of a client::store_block component of the SSH system in some embodiments. A client::store_block component 400 is invoked by a secondary tenant to store a block and is passed a block identifier and the block to store. In block 401, the component invokes a filesystem::get_storage_servers component to identify the servers for storing the replicas. In block 402, the component selects the next server for storing replicas, starting with the first. In decision block 403, if all the servers have already been selected, then the component completes, else the component continues at block 404. In block 404, the component invokes the server::store_block component of the selected server passing the block to store at that server. The component then loops to block 402 to select the next server.

Figure 5:
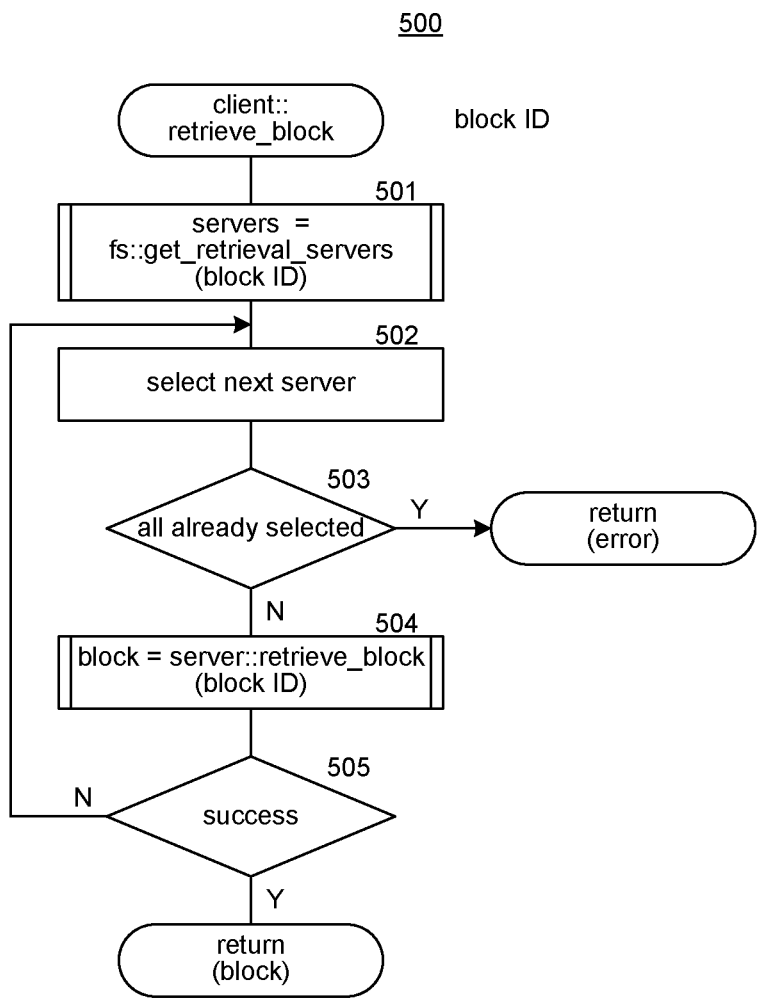
FIG. 5 is a flow diagram that illustrates processing of a client::retrieve_block component of the SSH system in some embodiments.

FIG. 5 is a flow diagram that illustrates processing of a client::retrieve_block component of the SSH system in some embodiments. A client::retrieve_block component 500 is invoked by a secondary tenant to retrieve a block that is identified by a block identifier. In block 501, the component invokes the filesystem::get_retrieval_servers component passing the block identifier, and receives a list of the servers at which replicas of the block are stored. In blocks 502-505, the component loops attempting to retrieve a replica of the block. In block 502, the component selects the next server in the list, starting with the first. In decision block 503, if all the servers have already been selected, then the block cannot be retrieved and the component returns an error, else the component continues at block 504. In block 504, the component invokes the server::retrieve_block component of the selected server, passing an indication of the block identifier, and receives the block in return. In decision block 505, if the block was successfully returned, then the component returns the block to the primary client, else the component loops to block 502 to select the next server.

Figure 6:
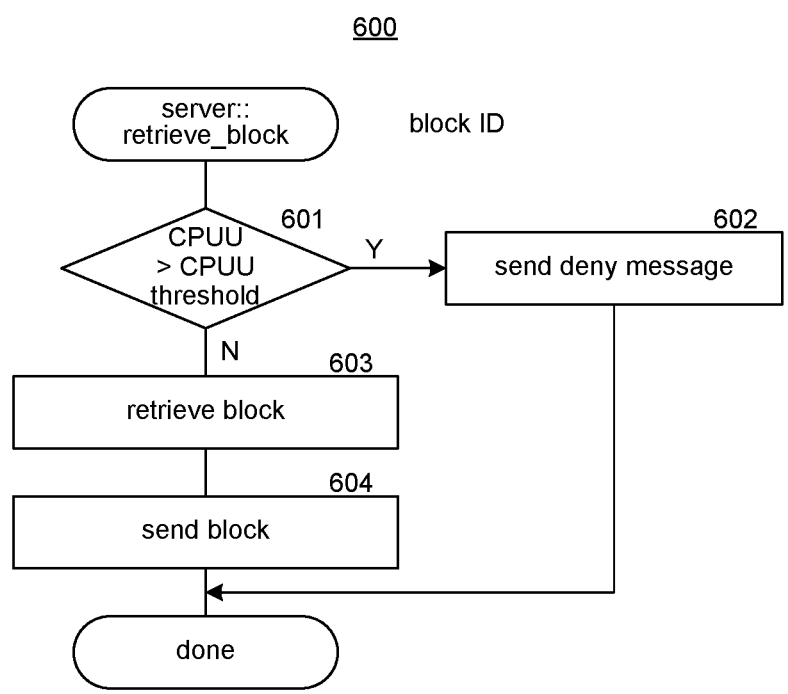
FIG. 6 is a flow diagram that illustrates the processing of a server::retrieve_block component of the SSH system in some embodiments.

FIG. 6 is a flow diagram that illustrates the processing of a server::retrieve_block component of the SSH system in some embodiments. A server::retrieve_block component 600 of a server is invoked, for example by a DN, in response to receiving a request from a client to retrieve a replica of a block stored at the server. In decision block 601, if the CPU utilization of the server is above a threshold CPU utilization, then the server is too busy to handle the retrieval request and the component continues at block 602, else the component continues at block 603. In block 603, the component retrieves the block from storage. In block 604, the component sends the block to the requesting client and then completes. In block 602, the component sends a deny message to the requesting client to indicate that the server cannot handle the request and then completes. The component may also deny a request for other reasons. For example, if the server was recently reimaged, then the server may no longer store the replica. In such a case, the server would deny the request.

Figure 7:
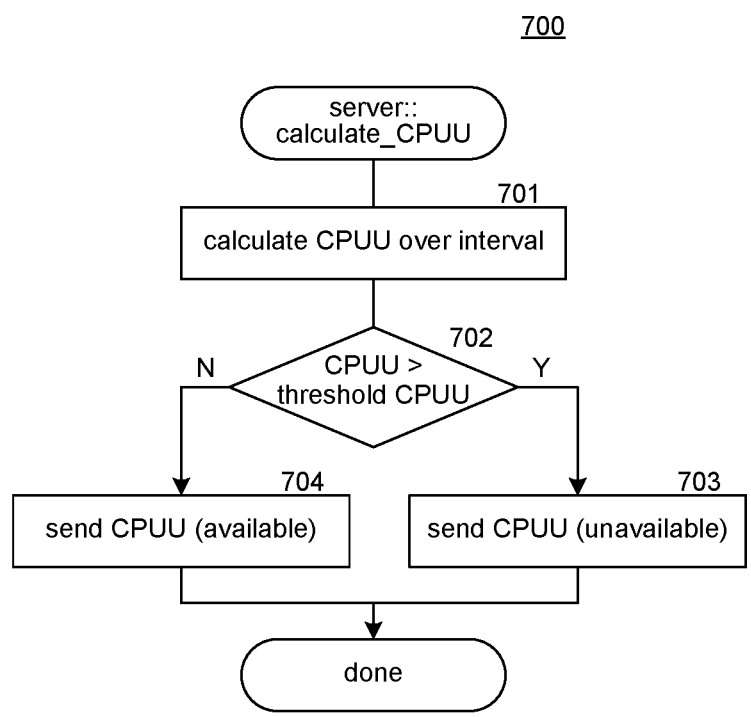
FIG. 7 is a flow diagram that illustrates processing of a server::calculate_CPU_utilization component of the SSH system in some embodiments.

FIG. 7 is a flow diagram that illustrates processing of a server::calculate_CPU_utilization component of the SSH system in some embodiments. A server::calculate_CPU_utilization component 700 is invoked periodically to calculate and report the CPU utilization ("CPUU") of a server. In block 701, the component calculates the CPU utilization over a designated interval, such as two minutes. In decision block 702, if the CPU utilization is greater than a threshold CPU utilization, then the component continues at block 703, else the component continues at block 704. In block 703, the component sends an indication of the CPU utilization to the SSH system along with an indication that the server is unavailable to store replicas and then completes. In block 704, the component sends an indication of the CPU utilization to the SSH system along with an indication that the server is available to store replicas and then completes.

Figure 8:
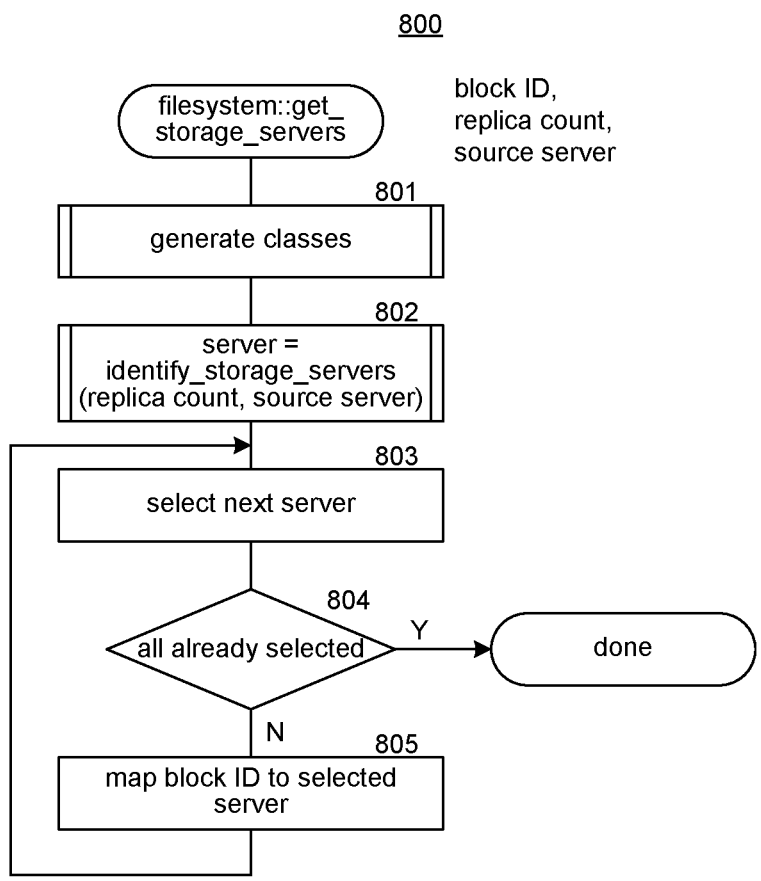
FIG. 8 is a flow diagram that illustrates the processing of a filesystem::get_storage_servers component of the SSH system in some embodiments.

FIG. 8 is a flow diagram that illustrates the processing of a filesystem::get_storage_servers component of the SSH system in some embodiments. A filesystem::get_storage_servers component 800 is invoked to identify servers for storing replicas of a block. The component is passed a block identifier, a replica count, and an indication of the source server that created the block. In block 801, the component invokes a generate classes component to assign the servers to classes based on their CPU utilization and REI rate. Although illustrated as being invoked whenever the get_storage_servers component is invoked, the generate classes component may be invoked less frequently, such as once a day, whenever server statistics change significantly, and so on. In block 802, the component invokes an identify_storage_servers component passing an indication of the replica count and an indication of the source server. The identify storage servers component returns a list of servers for storing replicas of the block. In blocks 803-805, the component loops mapping the block identifier to each server. In block 803, the component selects the next server. In decision block 804, if all the servers have already been selected, then the component completes, else the component continues at block 805. In block 805, the component stores the mapping of the block identifier to the selected server in the replica map store and then loops to block 803 to select the next server.

Figure 9:
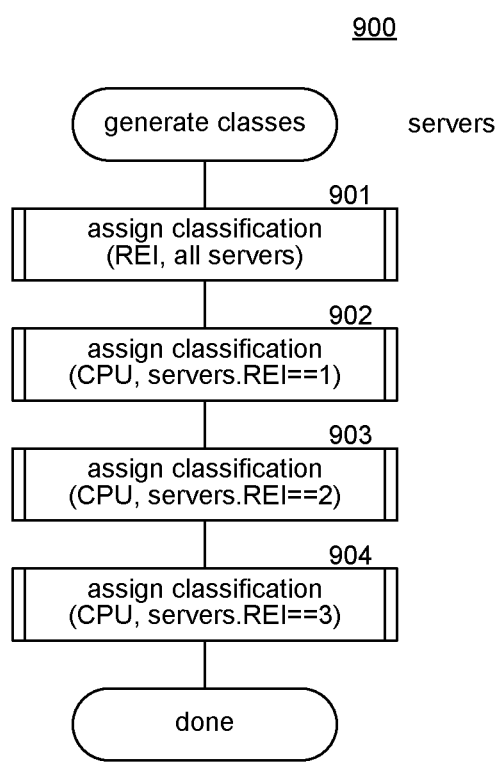
FIG. 9 is a flow diagram that illustrates processing of a generate classes component of the SSH system in some embodiments.

FIG. 9 is a flow diagram that illustrates processing of a generate classes component of the SSH system in some embodiments. A generate classes component 900 is invoked passing an indication of the servers that are to be assigned to the classes (e.g., one class would have a CPU utilization classification of high and an REI rate classification of medium). In block 901, the component invokes an assign classification component passing an indication to assign an REI rate classification to all servers. In block 902, the component invokes the assign classification component passing an indication to assign a CPU utilization classification to all the servers with an REI rate classification of one (or low). In block 903, the component invokes the assign classification component passing an indication to assign a CPU utilization classification to all the servers with an REI rate classification of two (or medium). In block 904, the component invokes the assign classification component passing an indication to assign a CPU utilization classification to all servers with an REI rate of three (or high). The component then completes.

Figure 10:
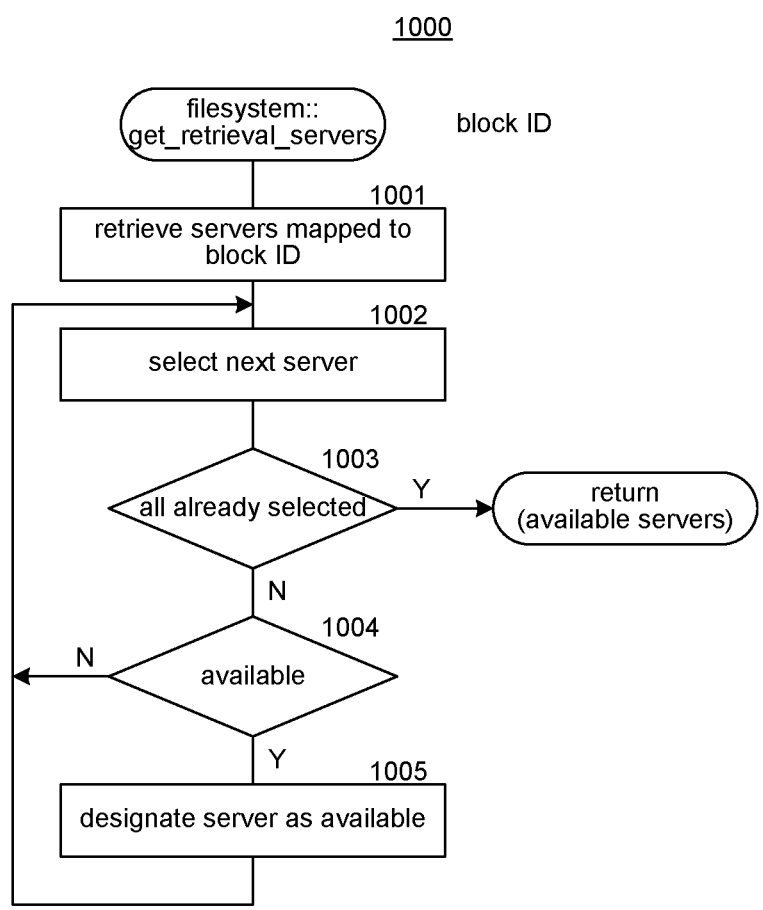
FIG. 10 is a flow diagram that illustrates processing of a filesystem::get_retrieval_servers component of the SSH system in some embodiments.

FIG. 10 is a flow diagram that illustrates processing of a filesystem::get_retrieval_servers component of the SSH system in some embodiments. A get_retrieval_servers component 1000 is passed a block identifier and returns a list of the servers that are available to retrieve a replica of the block. In block 1001, the component retrieves an indication of the servers mapped to that block identifier from the replica map store. In blocks 1002-1005, the component loops determining whether each of the servers is available for retrieval of a replica. In block 1002, the component selects the next server. In decision block 1003, if all the servers have already been selected, then the component returns an indication of the available servers, else the component continues at block 1004. In decision block 1004, if the selected server is available to retrieve a replica of the block (e.g., as last reported by the server), then the component continues at block 1005, else the component loops to block 1002 to select the next server. In block 1005, the component designates the selected server as available and then loops to block 1002 to select the next server.

Figure 11:
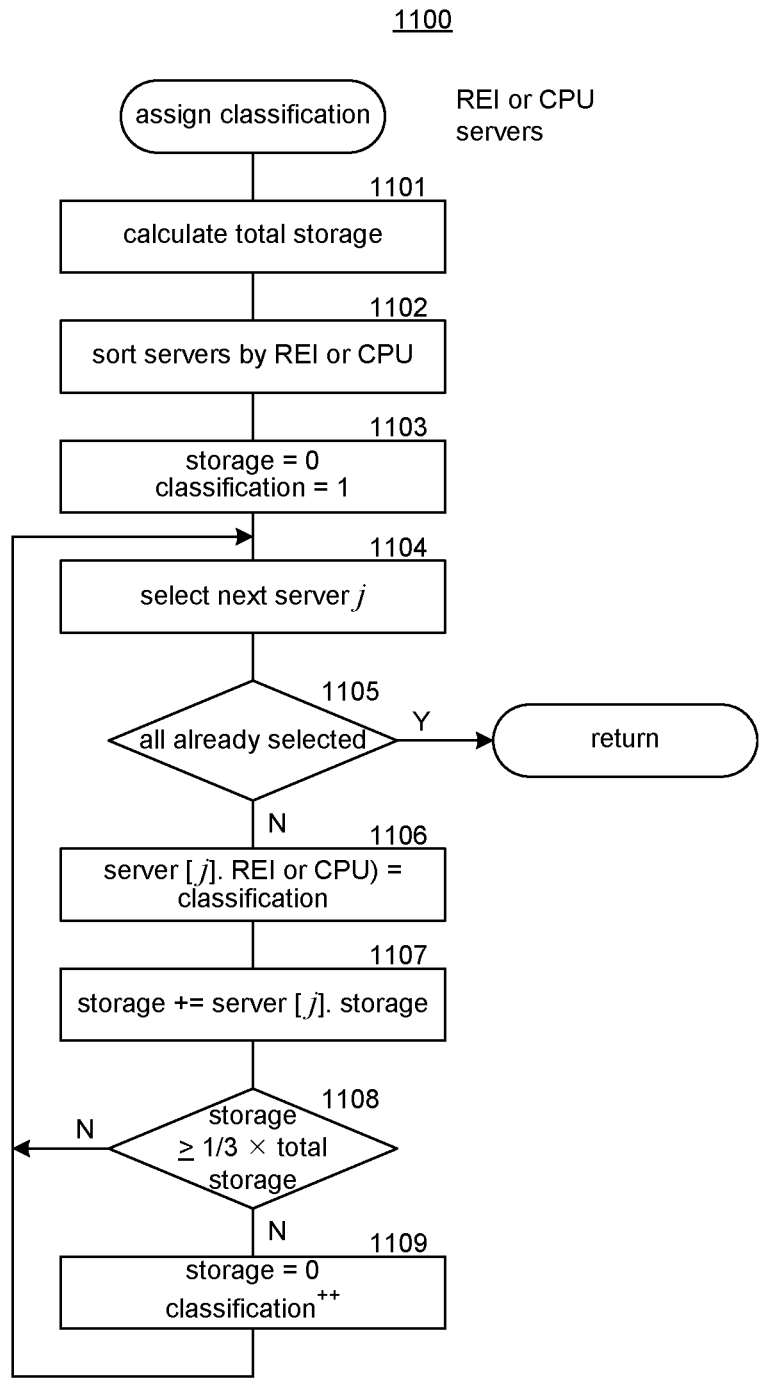
FIG. 11 is a flow diagram that illustrates processing of an assign classification component of the SSH system in some embodiments.

FIG. 11 is a flow diagram that illustrates processing of an assign classification component of the SSH system in some embodiments. An assign classification component 1100 is invoked passing an indication of whether an REI rate classification or a CPU utilization classification is to be set along with an indication of the servers. In block 1101, the component calculates the total available storage for the servers. In decision block 1102, the component sorts the servers by the REI rate or the CPU utilization, depending on which is to be set. In block 1103, the component initializes the current classification to one (i.e., low) and the amount of storage allocated to servers with the current classification to zero. In blocks 1104-1109, the component loops setting the classification for each server. In block 1104, the component selects the next server in the sorted list of servers. In decision block 1105, if all the servers have already been selected, then the component returns, else the component continues at block 1106. In block 1106, the component sets the REI rate classification or the CPU utilization classification, depending on which is to be set, of the selected server to the current classification. In block 1107, the component increments the storage allocated to the current classification by the amount of available storage of the selected server. In decision block 1108, if the storage allocated to the current classification is greater than ⅓ of the total storage, then the component continues at block 1109, else the component loops to block 1104 to select the next server. In block 1109, the component resets the storage to zero and increments the current classification and then loops to block 1104 to select the next server.

Figure 12:
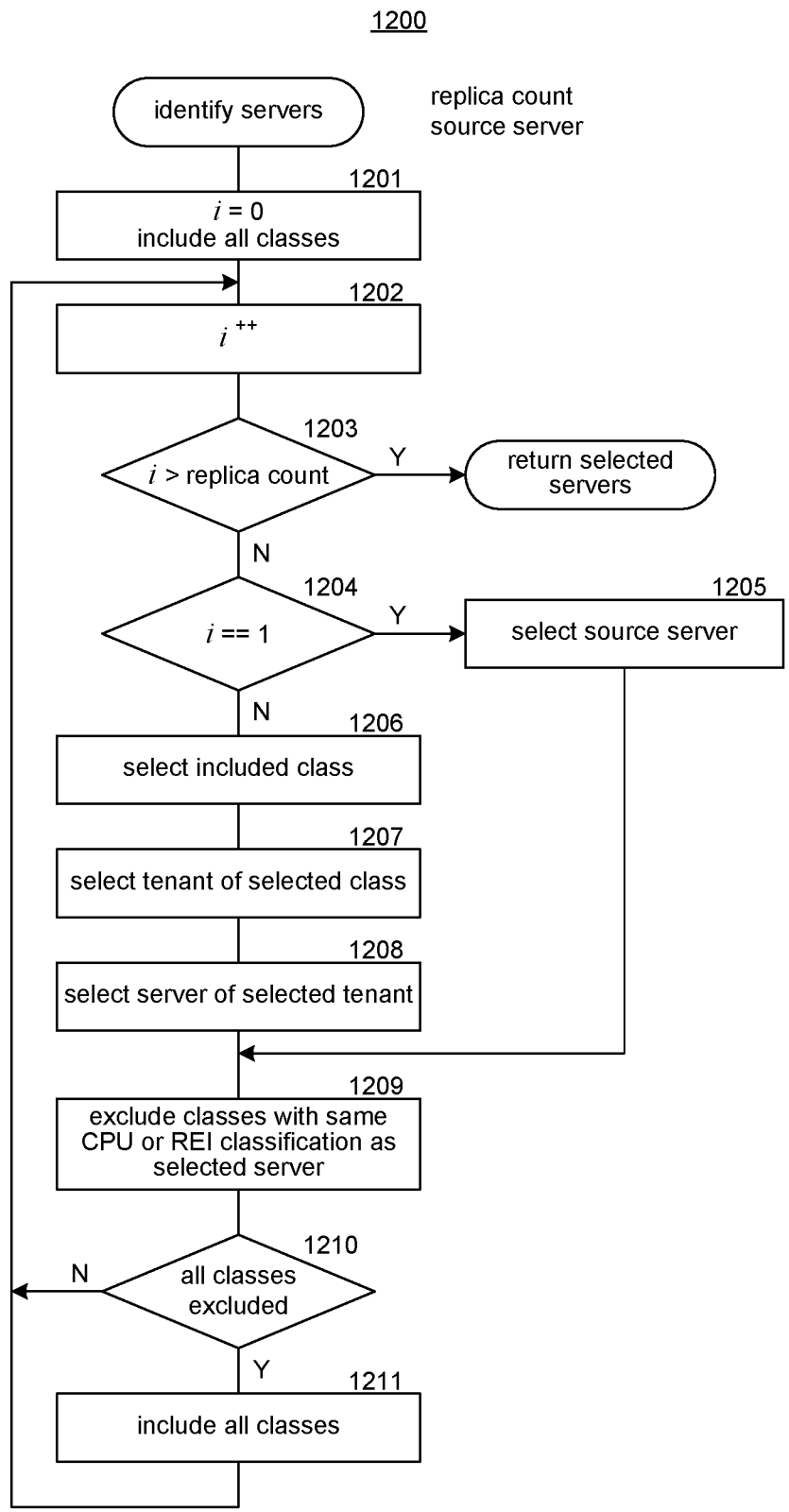
FIG. 12 is a flow diagram that illustrates processing of an identify servers component of the SSH system in some embodiments.

FIG. 12 is a flow diagram that illustrates processing of an identify servers component of the SSH system in some embodiments. An identify servers component 1200 is passed an indication of a desired replica count and the source server that created the block to be stored and identifies the servers at which replicas of the block are to be stored. In block 1201, the component initializes a running replica count (variable i) and sets all classes to be included. In block 1202, the component increments the running replica count. In decision block 1203, if the running replica count is greater than the desired replica count, then the component returns the servers that have been selected, else the component continues at block 1204. In decision block 1204, if the running replica count is one, then the component continues at block 1205, else the component continues at block 1206. In block 1205, the component specially handles the selection of the first server by selecting the source server for storing one of the replicas and then continues at block 1209. In block 1206, the component selects, possibly randomly, an included class of servers. In block 1207, the component selects, possibly randomly, a primary tenant with a server in the selected class such that the primary tenant has not already been selected for storing a replica of the block. In block 1208, the component selects a server of the selected primary tenant from the selected class. In block 1209, the component excludes the classes with the same CPU utilization classification or REI classification as the selected server. In decision block 1210, if all the classes have already been excluded, then the component continues at block 1211, else the component loops to block 1202 to increment the running replica count. In block 1211, the component includes all the classes again and then loops to block 1202 to increment the running replica count.

The following paragraphs describe various embodiments of aspects of the SSH system. An implementation of the SSH system may employ any combination of the embodiments. The processing described below may be performed by a computing device with a processor that executes computer-executable instructions stored on a computer-readable storage medium that implements the SSH system.

A method performed by a computing device for selecting servers for storage of replicas of data is provided. The method selects a first server for storage of the data. The first server has a first replica accessibility classification. The method then selects a second server for storage of the data. The second server has a second replica accessibility classification such that the second replica accessibility classification is different from the first replica accessibility classification. In some embodiments, the first replica accessibility classification and the second replica accessibility classification are based on a resource utilization measurement. In some embodiments, the first replica accessibility classification and the second replica accessibility classification are based on a lost replica measurement. In some embodiments, the replica accessibility classification is based on a resource utilization measurement and a lost replica measurement. In some embodiments, the resource utilization measurement is processor utilization and the lost replica measurement is reimaging rate. In some embodiments, the servers with the same replica accessibility classification have similar processor utilization and similar reimaging rates. In some embodiments, the servers host primary tenants and each primary tenant has a replica accessibility classification based on the replica accessibility measurements of the servers that host that primary tenant, and each server has the replica accessibility classification of the primary tenant that that server hosts and further wherein, prior to selecting the first server, the method selects a first primary tenant wherein the primary tenant has the first replica accessibility classification and the first server is selected from the servers that host the first primary tenant and further wherein, prior to selecting the second server, the method selects a second primary tenant wherein the second primary tenant has a second replica accessibility classification that is different from the first replica accessibility classification and wherein the second server is selected from the servers that host the second primary tenant. In some embodiments, the first server is in a first logical grouping of servers and the second server is in a second logical grouping of servers, such that the second logical grouping is different from the first logical grouping. In some embodiments, each server is assigned to an environment and all the servers with the same environment are in the same logical grouping. In some embodiments, each server is assigned to an environment and a machine function within its environment and all the servers with the same environment and the same machine function within that environment are in the same logical grouping. In some embodiments, the method further selects a third server for storage of data where the third server has a third replica accessibility classification that is different from the first replica accessibility classification and the second replica accessibility classification. In some embodiments, the method stores a replica of the data at the first server and at the second server. In some embodiments, the first server is the source of the data.

A method performed by a computing device for selecting servers for storage of replicas of data is provided. The method selects a first primary tenant having a first replica accessibility classification. The method selects a first server for storage of the data such that the first server hosts the first primary tenant. The method selects a second primary tenant having a second replica accessibility classification that is different from the first replica accessibility classification. The method also selects a second server for storage of the data such that the second server hosts the second primary tenant. In some embodiments, the replica accessibility classifications of the primary tenants are based on a resource utilization measurement and a lost replica measurement. In some embodiments, the resource utilization measurement is processor utilization and the lost replica measurement is reimaging rate. In some embodiments, the replica accessibility classification is based on a resource utilization classification and a lost replica classification, and the second primary tenant has a resource utilization classification and a lost replica classification that is different from that of the first primary tenant. In some embodiments, the method further selects a third primary tenant having a third replica accessibility classification that is different from the first replica accessibility classification and the second replica accessibility classification, and selects a third server for storage of the data such that the third server hosts the third primary tenant.

A computer system for selecting servers for storage of replicas of data is provided. The computer system comprises a computer-readable storage medium and a processor. The computer-readable storage medium stores computer-executable instructions. When executed, the instructions select a server that is a source of the data and designate as taken the processor utilization classification and the reimaging rate classification of that server. The instructions, for each additional server to be selected, if all the processor utilization classifications and the reimaging rate classifications have been designated as taken, designate as not taken all the processor utilization classifications and reimaging rate classifications. The instructions further randomly select a server with a processor utilization classification that is not designated as taken and a reimaging rate classification that is not designated as taken and designate as taken the processor utilization classification and the reimaging rate classification of that server. The processor is for processor for executing the computer-executable instructions stored in the computer-readable storage medium. In some embodiments, the total available storage of the servers in each combination of a processor utilization classification and a reimaging rate classification is approximately the same. In some embodiments, for each processor utilization classification, the servers with the same reimaging rate classification consist of all the servers with that processor utilization classification in a range of reimaging rates. In some embodiments, for each reimaging rate classification, the servers with the same processor utilization classification consist of all the servers with that reimaging rate classification in a range of processor utilization classifications.

A method performed by a computing device for selecting servers for storage of replicas of data is provided. The method selects a first server for storage of the data where the first server having a first processor utilization classification and a first reimaging rate classification. The method selects a second server for storage of the data where the second server having a second processor utilization classification and a second reimaging rate classification. Further, the second processor utilization classification is different from the first processor utilization classification and the second reimaging rate classification is different from the first reimaging rate classification. In some embodiments, the method clusters the servers into classes such that servers in the same class are assigned the same processor utilization classification and the same reimaging rate classification. In some embodiments, the clustering comprises generating super classes of servers such that the total amount of available storage of the servers in each super class is approximately the same and each super class includes all the servers in a range of reimaging rates, the servers in each super class having the same reimaging rate classification. In some embodiments, the clustering further comprises for each super class, generating classes of servers in that super class such that the total amount of available storage of the servers in each class of servers in that super class is approximately the same and each class of the servers in that super class includes all the servers in the super class in a range of processor utilizations where the servers in each class of the super class have the same processor utilization classification. In some embodiments, the clustering comprises generating super classes of servers such that the total amount of available storage of the servers in each super class is approximately the same and each super class includes all the servers in a range of processor utilizations, the servers in each super class having the same processor utilization classification. The clustering further comprises for each super class, generating classes of servers in that super class such that the total amount of storage of the servers in each class of servers in that super class is approximately the same and each class of the servers in that super class includes all the servers in the super class in a range of reimaging rates where the servers in each class of the super class have the same reimaging rate classification. In some embodiments, the total amount of available storage of the server in each class is approximately the same. In some embodiments, each class includes all the servers in a range of processor utilizations that have the same reimaging rate. In some embodiments, each class includes all the servers in a range of reimaging rates that have the same processor utilization classification. In some embodiments, the first server is in a first logical grouping of servers and the second server is in a second logical grouping of servers, such that the second logical grouping is different from the first logical grouping. In some embodiments, each server is assigned to an environment and all the servers with the same environment are in the same logical grouping. In some embodiments, each server is assigned to an environment and a machine function within its environment and all the servers with the same environment and the same machine function within that environment are in the same logical grouping. In some embodiments, the method further selects a third server for storage of data where the third server has a third processor utilization classification and a third reimaging rate classification such that the third processor utilization classification is different from the first processor utilization classification and the second processor utilization classification and the third reimaging rate classification is different from the first reimaging rate classification and the second reimaging rate classification. In some embodiments, the method further stores a replica of the data at the first server and at the second server. In some embodiments, the first server is the source of the data.

A method performed by a computing device for selecting servers for storage of replicas of data is provided. The method selects ng a first server for storage of the data, the first server having a first logical grouping. The method selects a second server for storage of the data where the second server has a second logical grouping such that the second logical grouping is different from the first logical grouping. In some embodiments, each server is assigned to an environment and all the servers with the same environment are in the same logical grouping. In some embodiments, each server is assigned to an environment and a machine function within the environment and all the servers with the same environment and the same machine function within that environment are in the same logical grouping. In some embodiments, the method further selects a third server for storage of data, the third server having a third logical grouping, such that the third logical grouping is different from the first logical grouping and the second logical grouping. In some embodiments, the logical groupings are not based on a physical location of servers within a data center.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing device for selecting servers for storage of replicas of data, the method comprising:
   determining a central processing unit ("CPU") utilization for each of a plurality of servers;
   calculating a replica accessibility classification for each of the plurality of servers using the CPU utilization as input;
   selecting a first server for storage of the data, the first server having a first replica accessibility classification;
   selecting a second server for storage of the data, the second server having a second replica accessibility classification, such that the second replica accessibility classification is different from the first replica accessibility classification; and
   storing the data on the first server and the second server.

2. The method of claim 1 wherein the first replica accessibility classification and the second replica accessibility classification are based on a resource utilization measurement.

3. The method of claim 1 wherein the first replica accessibility classification and the second replica accessibility classification are based on a lost replica measurement.

4. The method of claim 1 wherein the replica accessibility classification is based on a resource utilization measurement and a lost replica measurement.

5. The method of claim 4 wherein the resource utilization measurement is processor utilization and the lost replica measurement is reimaging rate.

6. The method of claim 5 wherein the servers with the same replica accessibility classification have similar processor utilization and similar reimaging rates.

7. The method of claim 1 wherein the servers host primary tenants and each primary tenant has a replica accessibility classification based on the replica accessibility measurements of the servers that host that primary tenant, wherein each server has the replica accessibility classification of the primary tenant that that server hosts, and further comprising:
   prior to selecting the first server, selecting a first primary tenant wherein the primary tenant has the first replica accessibility classification and the first server is selected from the servers that host the first primary tenant; and
   prior to selecting the second server, selecting a second primary tenant wherein the second primary tenant has a second replica accessibility classification that is different from the first replica accessibility classification and wherein the second server is selected from the servers that host the second primary tenant.

8. The method of claim 1 wherein the first server is in a first logical grouping of servers and the second server is in a second logical grouping of servers, such that the second logical grouping is different from the first logical grouping.

9. The method of claim 8 wherein each server is assigned to an environment and all the servers with the same environment are in the same logical grouping.

10. The method of claim 8 wherein each server is assigned to an environment and a machine function within its environment and all the servers with the same environment and the same machine function within that environment are in the same logical grouping.

11. The method of claim 1 further comprising selecting a third server for storage of data, the third server having a third replica accessibility classification that is different from the first replica accessibility classification and the second replica accessibility classification.

12. The method of claim 1 further comprising storing a replica of the data at the first server and at the second server.

13. The method of claim 1 wherein the first server is the source of the data.

14. A method performed by a computing device for selecting servers for storage of replicas of data, the method comprising:
   determining a central processing unit ("CPU") utilization for each of a plurality of servers;
   determining a reimaging ("REI") rate for each of the plurality of servers;
   calculating a replica accessibility classification for each of the plurality of servers using the CPU utilization and REI rate as input;
   selecting a first primary tenant having a first replica accessibility classification;
   selecting a first server for storage of the data such that the first server hosts the first primary tenant;
   selecting a second primary tenant having a second replica accessibility classification that is different from the first replica accessibility classification;
   selecting a second server for storage of the data such that the second server hosts the second primary tenant; and
   storing the data on the first server and the second server.

15. The method of claim 14 wherein the replica accessibility classifications of the primary tenants are based on a resource utilization measurement and a lost replica measurement.

16. The method of claim 15 wherein the resource utilization measurement is processor utilization and the lost replica measurement is reimaging rate.

17. The method of claim 15 wherein the replica accessibility classification is based on a resource utilization classification and a lost replica classification and the second primary tenant has a resource utilization classification and a lost replica classification that is different from that of the first primary tenant.

18. The method of claim 14 further comprising:
   selecting a third primary tenant having a third replica accessibility classification that is different from the first replica accessibility classification and the second replica accessibility classification; and
   selecting a third server for storage of the data such that the third server hosts the third primary tenant.

19. A computer-storage media having computer executable instructions embodied thereon, which when executed by a computing device, cause the computing device to perform a method for selecting servers for storage of replicas of data, the method comprising:
   determining a central processing unit ("CPU") utilization for each of a plurality of servers;
   calculating a replica accessibility classification for each of the plurality of servers using the CPU utilization as input;
   selecting a first primary tenant having a first replica accessibility classification;
   selecting a first server for storage of the data such that the first server hosts the first primary tenant;
   selecting a second primary tenant having a second replica accessibility classification that is different from the first replica accessibility classification;
   selecting a second server for storage of the data such that the second server hosts the second primary tenant; and
   storing the data on the first server and the second server.

20. The media of claim 19 wherein the replica accessibility classifications of the primary tenants are based on a resource utilization measurement and a lost replica measurement.

\* \* \* \* \*